(12) United States Patent
Ali-Tolppa et al.

(10) Patent No.: US 12,543,096 B2
(45) Date of Patent: Feb. 3, 2026

(54) MAKE-BEFORE-BREAK MOBILITY OF MACHINE LEARNING CONTEXT

(71) Applicant: Nokia Technologies Oy, Espoo (FI)

(72) Inventors: Janne Tapio Ali-Tolppa, Espoo (FI); Teemu Mikael Veijalainen, Espoo (FI); Ahmad Awada, Munich (FI); Muhammad Majid Butt, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 368 days.

(21) Appl. No.: 18/254,740

(22) PCT Filed: Nov. 30, 2020

(86) PCT No.: PCT/EP2020/083889
§ 371 (c)(1),
(2) Date: May 26, 2023

(87) PCT Pub. No.: WO2022/111827
PCT Pub. Date: Jun. 2, 2022

(65) Prior Publication Data
US 2023/0422126 A1    Dec. 28, 2023

(51) Int. Cl.
*H04W 36/18*    (2009.01)
*H04W 36/32*    (2009.01)
*H04W 36/00*    (2009.01)

(52) U.S. Cl.
CPC .... *H04W 36/322* (2023.05); *H04W 36/00837* (2018.08); *H04W 36/185* (2023.05)

(58) Field of Classification Search
CPC .................................................. H04W 36/322
(Continued)

(56) References Cited

U.S. PATENT DOCUMENTS

2018/0032915 A1*   2/2018   Nagaraju ............ G06V 10/776
2020/0186227 A1    6/2020   Reider et al.
(Continued)

FOREIGN PATENT DOCUMENTS

WO    2019/172813 A1    9/2019
WO    2020/122669 A1    6/2020
WO    2021/224705 A1    11/2021

OTHER PUBLICATIONS

Butt et al., "RF Fingerprinting and Deep Learning Assisted UE Positioning in 5G", IEEE 91st Vehicular Technology Conference (VTC2020-Spring), May 25-28, 2020, 7 pages.
(Continued)

*Primary Examiner* — Faruk Hamza
*Assistant Examiner* — Jean F Voltaire
(74) *Attorney, Agent, or Firm* — Lippes Mathias LLP

(57) ABSTRACT

A method comprising: storing a received first and machine learning model instance and a received second machine learning model instance in a cache of a terminal, wherein the first machine learning model instance is associated to a first cell and configured to make, if activated, a first prediction for the terminal, and the second machine learning model instance is associated to a second cell different from the first cell and configured to make, if activated, a second prediction for the terminal; checking if a predefined first requirement is fulfilled; activating the first machine learning model instance to make the first prediction if the predefined first requirement is fulfilled; inferring a decision involving the terminal based on the first prediction if the predefined first requirement is fulfilled; inhibiting to infer the decision involving the terminal based on the second prediction if the predefined first requirement is fulfilled.

18 Claims, 7 Drawing Sheets

(58) Field of Classification Search
USPC .......................................................... 370/331
See application file for complete search history.

(56) References Cited

U.S. PATENT DOCUMENTS

2020/0304364 A1\*  9/2020  Tapia ........................ G06N 7/01
2020/0413316 A1\* 12/2020  Isaksson ............. H04W 36/362

OTHER PUBLICATIONS

"AI/ML methods", 3GPP TSG-RAN WG2 Meeting #121, R2-2300398, Agenda: 8.16.2, Nokia, Feb. 27-Mar. 3, 2023, 11 pages.
International Search Report and Written Opinion received for corresponding Patent Cooperation Treaty Application No. PCT/EP2020/083889, dated Sep. 9, 2021, 14 pages.
Notice of Allowance received for corresponding European Patent Application No. 20816964.9, dated May 29, 2024, 8 pages.

\* cited by examiner

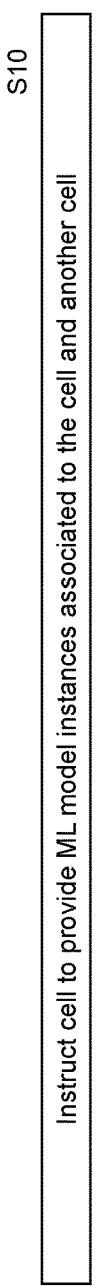
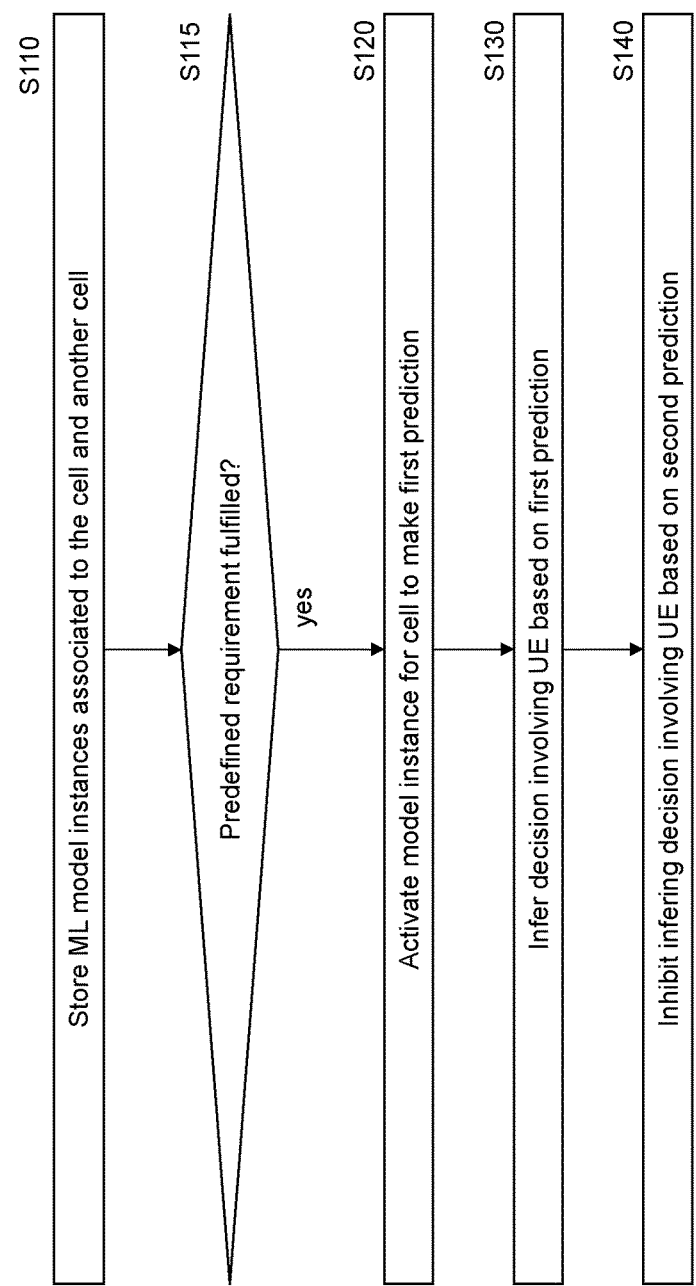
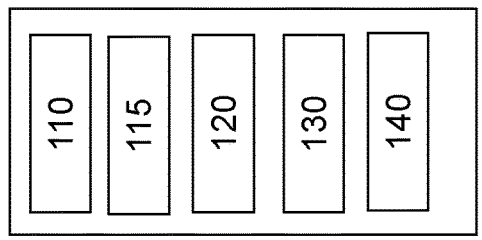
Fig. 7
Fig. 9
Fig. 6
Fig. 8

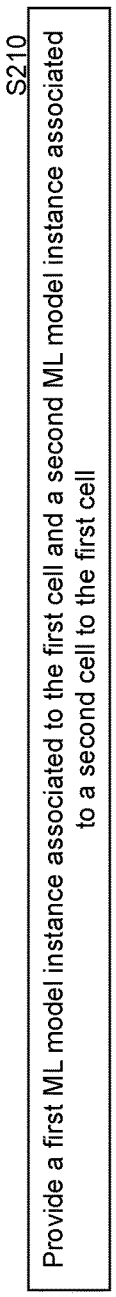
Fig. 11
Provide a first ML model instance associated to the first cell and a second ML model instance associated to a second cell to the first cell   S210
210
Fig. 10
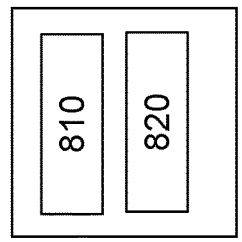
Fig. 12

MAKE-BEFORE-BREAK MOBILITY OF MACHINE LEARNING CONTEXT

RELATED APPLICATION

This application claims the benefit of and priority to PCT Patent Application No. PCT/EP2020/083889 filed on Nov. 30, 2020, which is incorporated by reference herein in its entirety.

FIELD OF THE INVENTION

The present disclosure relates to mobility in the context of machine learning models.

Abbreviations

3GPP $3^{rd}$ Generation Partnership Project
3G/4G/5G $3^{rd}/4^{th}/5^{th}$ Generation
eNB evolved NodeB
gNB NodeB of next generation
HO Handover
KPI Key Performance Indicator
LSTM Long-Short Term Memory
MIMO Multiple Input—Multiple Output
ML Machine Learning
OSS Operations Support Systems
RLF Radio Link Failure
RNN Recurrent Neural Network
RRM Radio Resource Management
RSRP Reference Signal Receive Power
UE User Equipment

BACKGROUND OF THE INVENTION

In several network automation use cases, the required ML models should not cover the complete network in one ML model instance. A model instance needs to be trained to learn the specific characteristics of each local context, for example in use cases that depend on the local radio propagation environment, such as mobility prediction and positioning. To include all local contexts into one single ML model instance would make it impractically large for several reasons. Simply, the size of the required ML model instance may become a problem and a single monolithic instance doesn't allow for different ML lifecycles (deployment, training, retraining etc.) for each of the local contexts.

Also, depending on the implemented ML model, the model size may also impact the performance of the ML model [1].

For this purpose, U.S. provisional 63/020,466 "Measurement configuration for local area ML RRM" [2] defines the concepts of ML validity and measurement areas. Validity area is the area or scope, within which the machine learning model instance makes predictions or other insights based on the inference. For this, it may need input data, such as measurements or Key Performance Indicator (KPIs) from a wider scope, the measurement area.

An example of a predictive handover concept utilizes ML for predicting the optimal handover target and point in time.

As shown in FIG. 1, for prediction, the ML model uses a continuous stream of UE RSRP measurements, from specific cells, with certain measurement frequency. The results show that the performance gains are increasing as a function of the measurement frequency. Close real-time measurements (every ~10 ms) are needed to get the highest performance gains, which means that the inference may need to be done in the UE itself.

For training, the ML utilizes logged measurements from the specific cells with the same frequency as prediction. The training data is split into input and output frames. Input frame is N samples in time from K cells, and output frame is M samples after the input frame. The output frame is used to estimate the optimal handover target for the input, this process is also called labeling (see FIG. 1). This enables the ML model to learn the optimal handover point and target based on the input frame data.

REFERENCES

[1] Majid Butt et al., "RF Fingerprinting and Deep Learning Assisted UE Positioning in 5G", IEEE VTC2020.
[2] U.S. provisional 63/020,466 "Measurement configuration for local area ML RRM"

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: instruct a first cell to provide, to a terminal, a first machine learning model instance associated to the first cell and a second machine learning model instance associated to a second cell different from the first cell.

According to a second aspect of the invention, there is provided an apparatus comprising: one or more processors, and memory storing instructions that, when executed by the one or more processors, cause the apparatus to: store a received first and machine learning model instance and a received second machine learning model instance in a cache of a terminal, wherein the first machine learning model instance is associated to a first cell and configured to make, if activated, a first prediction for the terminal, and the second machine learning model instance is associated to a second cell different from the first cell and configured to make, if activated, a second prediction for the terminal; check if a predefined first requirement is fulfilled; activate the first machine learning model instance to make the first prediction if the predefined first requirement is fulfilled; infer a decision involving the terminal based on the first prediction if the predefined first requirement is fulfilled; inhibit to infer the decision involving the terminal based on the second prediction if the predefined first requirement is fulfilled.

According to a third aspect of the invention, there is provided an apparatus comprising: one or more processors, and memory storing instructions that, when executed by the one or more processors, cause the apparatus to: provide a first cell with a first machine learning model instance associated to the first cell and a second machine learning model instance associated to a second cell different from the first cell.

According to a fourth aspect of the invention, there is provided a method comprising: instructing a first cell to provide, to a terminal, a first machine learning model instance associated to the first cell and a second machine learning model instance associated to a second cell different from the first cell.

According to a fifth aspect of the invention, there is provided a method comprising: storing a received first and machine learning model instance and a received second machine learning model instance in a cache of a terminal, wherein the first machine learning model instance is associated to a first cell and configured to make, if activated, a first prediction for the terminal, and the second machine learning model instance is associated to a second cell different from the first cell and configured to make, if activated, a second prediction for the terminal; checking if a predefined first requirement is fulfilled; activating the first machine learning model instance to make the first prediction if the predefined first requirement is fulfilled; inferring a decision involving the terminal based on the first prediction if the predefined first requirement is fulfilled; inhibiting to infer the decision involving the terminal based on the second prediction if the predefined first requirement is fulfilled.

According to a sixth aspect of the invention, there is provided a method comprising: providing a first cell with a first machine learning model instance associated to the first cell and a second machine learning model instance associated to a second cell different from the first cell.

Each of the methods of the fourth to sixth aspects may be a method of machine learning.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
  seamless (uninterrupted) inference even when crossing the border of a ML model instance validity area improved quality of service for the end user;
  less handover failures or RLFs;
  reduced data transmission of ML model instances, in particular in case of ping-pong handover.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 6 shows an apparatus according to an example embodiment of the invention;

FIG. 7 shows a method according to an example embodiment of the invention;

FIG. 8 shows an apparatus according to an example embodiment of the invention;

FIG. 9 shows a method according to an example embodiment of the invention;

FIG. 10 shows an apparatus according to an example embodiment of the invention;

FIG. 11 shows a method according to an example embodiment of the invention; and

FIG. 12 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

When a network automation use case is performed based on several ML model instances, where each has its own limited validity area (a geographical area or a subnetwork), transfers of machine learning context, i.e. "handovers" between the ML model instances covering different validity areas (not necessarily identical to cell coverage area), are needed. This means that, when a UE is handed over from a cell in the validity area of one ML model instance to a cell covered by another ML model instance, the ML model instance covering the UE will change.

However, collecting the necessary input data to start the inference in the new ML model instance (e.g. when time series of UE measurements is used in an LSTM RNN etc.) takes time before the new ML model instance becomes active and operational. In cases, where the inference needs to be done in the UE itself because of the required high inference frequency (for example in predictive ML-based mobility), the new ML model instance needs to be also first downloaded into the UE. This data transfer might be too slow and, consequently, there might be a too long interruption in the ML based network automation function.

Figure 1:
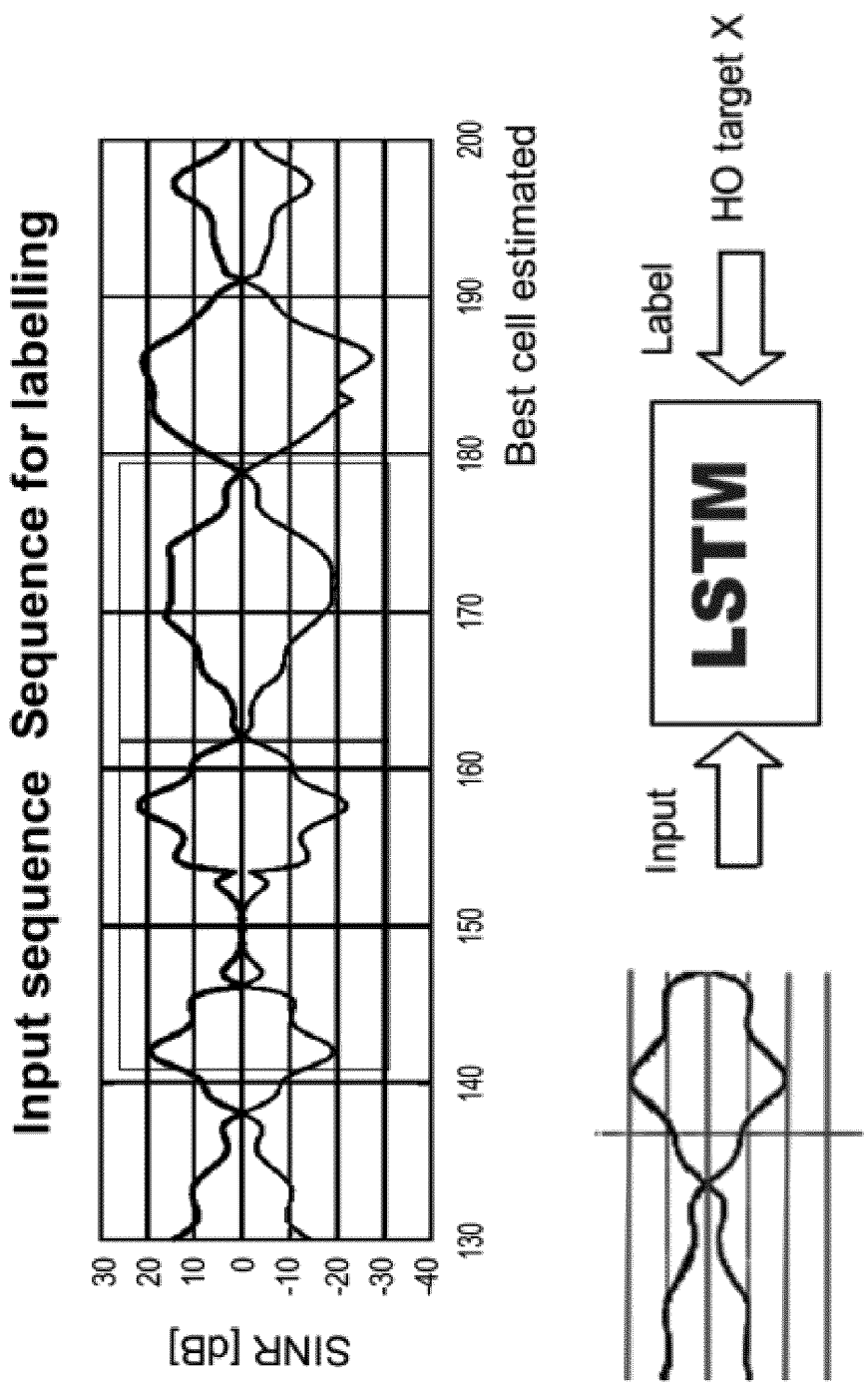
FIG. 1 explains labelling for predictive handover according to the prior art.
Figure 2:
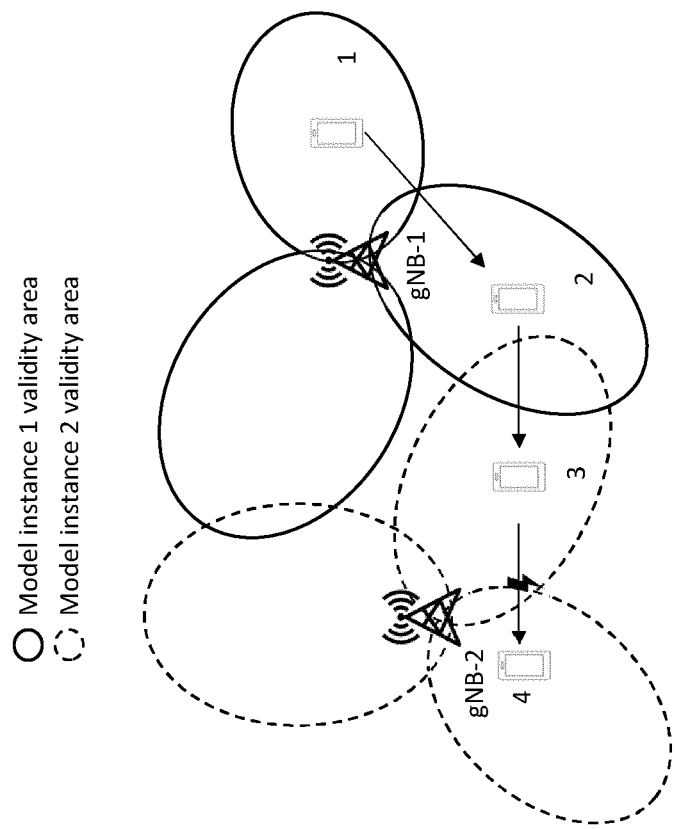
FIG. 2 shows handover of ML context from one model instance to another according to the prior art.

An example of the problem is shown in FIG. 2. In this example, both gNBs (gNB-1 and gNB-2) are covered by their own ML model instances, for example for predictive ML-based mobility use case. When the UE is handed over within the gNB-1 (e.g. from cell 1 to cell 2), it keeps inferring its mobility decisions with the same ML model instance 1. However, when it hands over to the gNB-2 (e.g. cell 3), it needs to update the ML model instance, which may mean downloading the new ML model instance in the UE as well as any required warmup of a stateful ML model instance. If the UE is moving fast, it may need to hand over to the next cell (e.g. cell 4), before the process is completed, which may result in the predictive handover to not perform as expected.

Furthermore, this problem is accentuated if the UE then hands back over to the original cell, in which case another full ML model reselection (i.e. download of the ML model instance of gNB-1 and potential warmup) needs to be immediately performed. In case of a ping-pong, where the UE hands over between the gNBs several times, the full ML model reselections have to be repeated.

The validity areas may not be covered only by different ML model instances, but also different ML models. This means, the hyper parameters may also vary. The problem remains the same also in this case.

Some example embodiments of the invention provide a make-before-break method for seamlessly handing over the ML context from one ML model instance validity area to another. To enable this, the ML model instance validity areas are designed to overlap at the validity area borders. Within the overlapping areas, one of the ML model instances is defined as active and one or more other ML model instances are defined as standby.

Additionally, in some example embodiments of the invention, based on mobility statistics, a cache area and time may be defined for each ML model instance. The downloaded ML model instances are recommended to be cached by the UE at least while the UE is within the cache area or until the cache time expires. This can help the UE to prioritize the cached ML model instances, in case it is running out of the space reserved for the cache. The cache area should be wider than the validity area including the overlaps with neighbouring ML model instances. Caching minimizes the need for re-downloading the ML model instance into the UE in case it is moving back and forth in the same area.

The definition and configuration of the validity and cache areas, the cache time and the related active and standby selections may be done by the Operations Support System (OSS).

Figure 3:
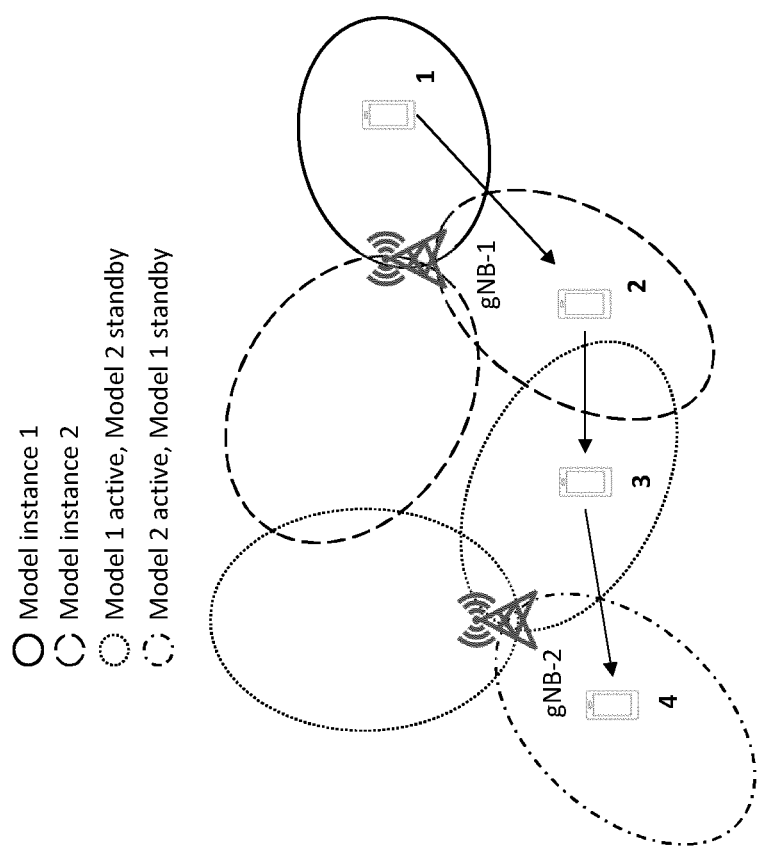
FIG. 3 shows make-before-break handover of ML context according to some example embodiments of the invention.

FIG. 3 shows how a method according to some example embodiments of the invention works. FIG. 3 shows the same network and the same movement of the UE as the example shown in Fig. The validity area of ML model instance 1 comprises cells 1, 2, and 3. The validity area of ML model instance 2 comprises calls 2, 3, and 4. Thus, cell 2 belongs to the validity area of both ML model instances 1 and 2, with ML model instance 1 configured as active and ML model instance 2 as standby (inactive). Similarly, cell 3 belongs to the validity area of both ML model instances 1 and 2, with ML model instance 2 configured as active and ML model instance 1 as standby (inactive).

When a UE enters the area of overlap of the validity areas (i.e. cell 2 or cell 3), the standby ML model instances (this can be more than one) may be downloaded into the UE, while the active (current) ML model instance continues with inference. In stateful ML models (e.g. LSTM RNN), even the inference may be started in the standby ML model instances to have the internal state ready when the respective ML model instance becomes active. When handing over in the overlap area (e.g. from cell 2 to cell 3), the UE may be requested to swap the active and standby ML model instances. Since active ML model instance and standby ML model instance(s) cover the overlap area, the swap may take place exactly at the point of handover but does not need to take place exactly at the point of handover. It may take place before or after the handover.

As another example, in case the UE experiences a RLF or handover failure in cell 2 and then re-establishes its radio connection to cell 3, the UE may perform the swap from the ML model instance 1 to the ML model instance 2. In this case, the swap of the two ML model instances is not triggered by handover but rather by failure recovery, where the UE might change cells. Once the UE leaves the overlap area, the standby ML model instance may be deactivated or removed (if not cached).

Figure 4:
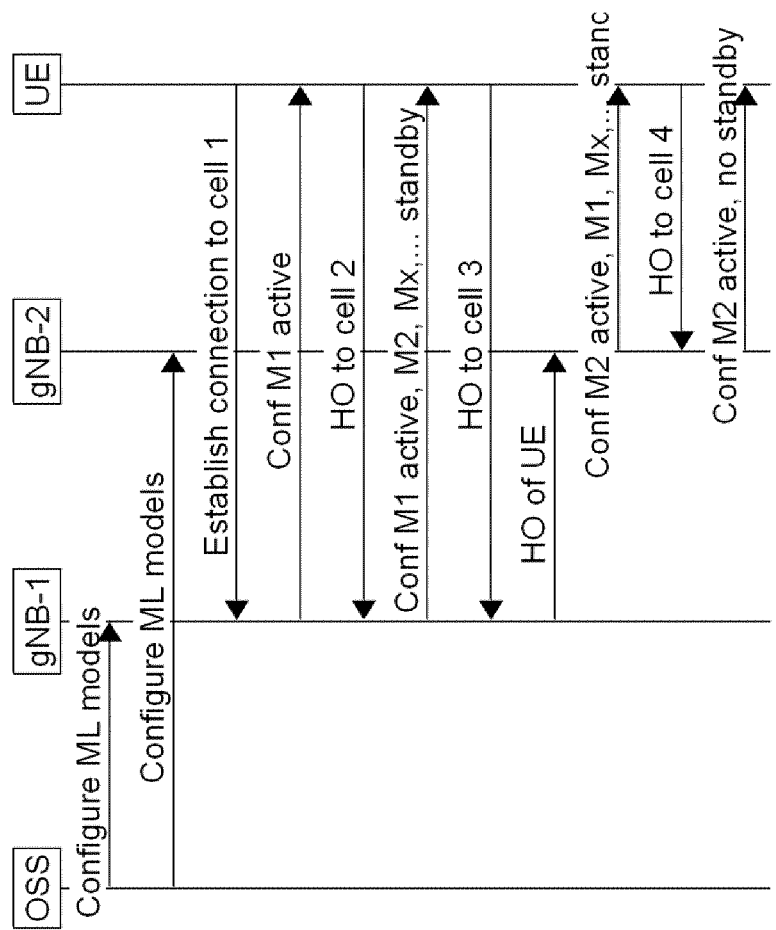
FIG. 4 shows a sequence diagram of the make-before-break handover of ML context according to some example embodiments of the invention.

FIG. 4 shows a sequence diagram for the example of predictive ML-based mobility shown in FIG. 3. First, OSS configures the required ML model instances in gNB-1 and gNB-2. When the UE connects to cell 1, ML model instance M1 is configured for inference of the predictive ML-based handover decisions. When the UE hands over to cell 2, gNB-1 already configures the ML model instance M2 in the UE as standby. Additional ML model instances, depicted in the sequence as Mx, may also be configured as standby ML model instances. The standby ML model instances are downloaded from the gNB-1 to the UE, if they are not already cached (stored) in the UE. Also, in some example embodiments, the UE may start feeding measurements into the standby ML model instances, for example to start updating the internal state of the LSTM RNN used for predictive mobility. However, ML model instance M1 remains active, i.e. it infers the handover decisions.

When the UE is handed over to cell 3 of gNB-2, the UE remains in the validity area of both ML model instances M1 and M2, and ML model instance M1 can continue with the inference. However, since ML model instance M2 is configured as active in cell 3 and the ML model instance M1 is configured as standby in cell 3, the UE swaps the active ML model instance, i.e. the one inferring the handover decisions, from ML model instance M1 to ML model instance M2. Due to the overlapping validity areas, this may or may not happen exactly at the handover. Nevertheless seamless inference can be ensured.

Lastly, when the UE is handed over to the cell 4 of gNB-2, the UE leaves the overlapping validity area of the two ML model instances. Then, UE may remove the ML model instance M1 from the standby ML model instances and the UE may choose to discard the ML model instance, unless it is decided to cache ML model instance M1.

Note that the validity area of each single ML model instance may cover an area of several gNBs, although in the example only a single gNB at the validity area border is shown.

Figure 5:
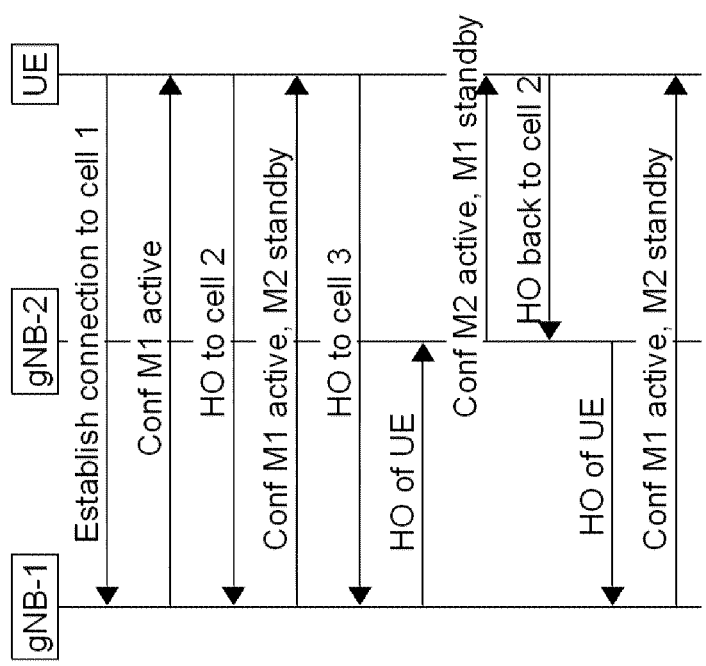
FIG. 5 shows a sequence diagram of the make-before-break handover of ML context in case of a ping pong according to some example embodiments of the invention.

FIG. 5 shows a sequence diagram of a ping pong handover at the validity area border, i.e. between cells 2 and 3 of FIG. 3. The UE only swaps the active and standby ML model instances, but full reselection of the ML model instances is not required. In some example embodiments, in an area with overlapping ML validities, the serving cell (for example cell 2 in FIG. 3) may configure the UE with a measurement event. gNB 1 provides the ML model instance M2 only when the measurement event occurs. This would be relevant for UEs that are served by cell 2 but are not expected to make a handover to cell 3 (e.g. because session is released before the handover, or the UE moves back to cell 1, etc. . . . ), especially in areas, where there may be more than two ML model instances with overlapping validity areas.

Example: Assume that the handover is triggered when $Mn>Ms+3$ dB, where Mn and Ms are neighboring and serving cell measurements, respectively. The serving cell may provide the UE with the standby ML model instance only when it receives a measurement event that is triggered by $Mn>Ms-1$ dB.

In the example embodiments of FIGS. 4 and 5, gNB-1 may provide the one or more standby ML model instances including the ML model instance M2 only when the UE is in the respective overlapping area (i.e. cell 2 for ML model instance M2 in this example). However, in some example embodiments, gNB-1 may provide at least some of the one or more standby ML model instances even when the terminal is not in the respective overlapping area.

According to the example embodiment of FIG. 4, OSS configures the active and the standby ML model instances in the gNB. However, according to some example embodiments, OS configures only the respective active ML model instance in each gNB, and the gNB exchange their ML model instances via Xn interface.

According to some example embodiments, gNB-1 may configure the UE with criteria (such as a radio condition, e.g. RSRP, RSRQ). In these embodiments, the UE may switch to the ML model instance M2 when the criterion is fulfilled. In some example embodiments, the UE may switch to the ML model instance M2 only if the UE is in the overlapping validity area (i.e. cells 2 and 3 in the example of FIG. 3) and the criterion is fulfilled.

According to some example embodiments, the gNB (serving cell) decides (i.e. configures the UE) which of the ML model instances is active, and which is (are) standby.

FIG. 6 shows an apparatus according to an example embodiment of the invention. The apparatus may be a base station such as a gNB, eNB etc., or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for instructing 10. The means for instructing 10 may be an instructing means. The means for instructing 10 may be an instructor. The means for instructing 10 may be an instructing processor.

The means for instructing 10 instructs a first cell to provide, to a terminal (e.g. UE), a first ML model instance associated to the first cell and a second ML model instance associated to a second cell different from the first cell (S10).

FIG. 8 shows an apparatus according to an example embodiment of the invention. The apparatus may be a terminal such as a UE, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for storing 110, means for checking 115, means for activating 120, means for inferring 130, and means for inhibiting 140. The means for storing 110, means for checking 115, means for activating 120, means for inferring 130, and means for inhibiting 140 may be a storing means, checking means, activating means, inferring means, and inhibiting means, respectively. The means for storing 110, means for checking 115, means for activating 120, means for inferring 130, and means for inhibiting 140 may be a storage device, checker, activator, inferer, and inhibiter, respectively. The means for storing 110, means for checking 115, means for activating 120, means for inferring 130, and means for inhibiting 140 may be a storing processor, checking processor, activating processor, inferring processor, and inhibiting processor, respectively.

The means for storing 110 stores a first ML model instance and a second ML model instance in a cache of a terminal (S110). Here, cache specifies any storage medium such as a RAM, a harddisk, etc. The first ML model instance is associated to a first cell. The second ML model instance is associated to a second cell different from the first cell. The first ML model instance is configured to make, if activated, a first prediction on a radio condition of the terminal. The second ML model instance is configured to make, if activated, a second prediction on the radio condition of the terminal. The radio condition may be e.g. an (optimum) point for handover, an (optimum) modulation and coding scheme, or any other radio condition.

The means for checking 115 checks if a predefined first requirement is fulfilled (S115). For example, the first requirement may include that the terminal is served by the first cell.

If the predefined first requirement is fulfilled (S115=yes):
The means for activating 120 activates the first ML model instance to make the first prediction (S120);
The means for inferring 130 infers a decision involving the terminal based on the first prediction (S130); and
The means for inhibiting 140 inhibits to infer the decision involving the terminal based on the second prediction (S140).

For example, the decision involving the terminal may be related to mobility of the terminal, such as a handover decision or the decision that the UE triggers a handover decision in the eNB. Also, the decision involving the terminal may be related to positioning of the UE.

An example where the decision involving the terminal is related to positioning is radio measurement fingerprinting (RF fingerprinting). RF fingerprinting based positioning uses signal strength measurements taken by a UE from a number of surrounding cells to determine its location. The signal strength of a given number of strongest cells are measured in a set number of known locations to create the training data. The IDs of the measured cells and their signal strengths are the "fingerprint" of those locations. The training data may be used to train a ML model that may learn to interpolate the UE location also between the locations for which the training data were collected.

FIG. 10 shows an apparatus according to an example embodiment of the invention. The apparatus may be a operations support system such as a OSS, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for providing 210. The means for providing 210 may be a providing means. The means for providing 210 may be a provider. The means for providing 210 may be a providing processor.

The means for providing 210 provides a first cell with a first ML model instance associated to the first cell and a second ML model instance associated to a second cell (S210). The second cell is different from the first cell.

FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 7, 9, and 11 and related description.

Different ML model instances may be different instances of the same ML model or instances of different ML models.

A prediction of an optimal point for handover is an example of a prediction of a radio condition. Other radio conditions which may be predicted by the respective ML model instance may be parameters for MIMO, a modulation and coding scheme, etc.

A cell may be represented by its respective base station (e.g. gNB or eNB). A validity area may comprise one or more cells. If the validity area comprises more than one cell they may be of the same or of different base stations.

Some example embodiments are explained with respect to a 5G network. However, the invention is not limited to 5G. It may be used in networks of other 3GPP generations, too, e.g. in previous generations such as 3G and 4G, and in forthcoming generations such as 6G, 7G, etc. The invention is not limited to 3GPP networks but may be used in other radio networks providing mobility, too. The names of the terminals (e.g. UE) and base stations (e.g. eNB, gNB) have to be adapted accordingly.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a base station, such as a eNB or gNB, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a terminal, such as a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an operation support system, such as an OSS, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus comprising:
one or more processors, and
memory storing instructions that, when executed by the one or more processors, cause the apparatus to:
store, in a cache of a terminal, a first machine learning model instance and a second machine learning model instance that are received, wherein the first machine learning model instance is associated to a first cell and configured to make, if activated, a first prediction for the terminal, and wherein the second machine learning model instance is associated to a second cell different from the first cell and configured to make, if activated, a second prediction for the terminal;
check if a predefined first requirement is fulfilled;
activate the first machine learning model instance to make the first prediction if the predefined first requirement is fulfilled;
infer a decision involving the terminal based on the first prediction if the predefined first requirement is fulfilled;
inhibit to infer the decision involving the terminal based on the second prediction if the predefined first requirement is fulfilled,
wherein the instructions, when executed by the one or more processors, further cause the apparatus to:
if the terminal was handed over from the second cell to the first cell:
check if the terminal is in a predefined cache area related to the second cell and if a predefined cache time has elapsed since the terminal was handed over from the second cell to the first cell;
remove the second machine learning model instance from the cache if the terminal is outside the predefined cache area and the predefined cache time has elapsed.

2. The apparatus according to claim 1, wherein the instructions, when executed by the one or more processors, further cause the apparatus to: monitor if an instruction is received from the first cell, wherein the instruction instructs the apparatus to determine that the predefined first requirement is fulfilled.

3. The apparatus according to claim 1, wherein the predefined first requirement comprises at least one of the following:
the terminal is served by the first cell; or a criterion is not fulfilled, wherein the criterion is received from the first cell.

4. The apparatus according to claim 1, wherein the instructions, when executed by the one or more processors, further cause the apparatus to:
inform the first cell that the terminal is storing the first machine learning model instance if the terminal is storing the first machine learning model instance and that the terminal stores the second machine learning model instance if the terminal is storing the second machine learning model instance.

5. The apparatus according to claim 4, wherein the instructions, when executed by the one or more processors, further cause the apparatus to at least one of the following:
monitor if an inquiry is received and inform the first cell in reply to the inquiry, wherein the inquiry asks if the terminal is storing at least one of the first machine learning model instance and the second machine learning model instance; or monitor if the terminal performs a handover to the first cell and inform the first cell when the terminal performs the handover.

6. The apparatus according to claim 1, wherein the instructions, when executed by the one or more processors, further cause the apparatus to:
activate the second machine learning model instance to make the second prediction if the predefined first requirement is fulfilled.

7. The apparatus according to claim 6, wherein the instructions, when executed by the one or more processors, further cause the apparatus to:
prohibit the activating the second machine learning model instance if a predefined second requirement is not fulfilled.

8. The apparatus according to claim 1, wherein the instructions, when executed by the one or more processors, further cause the apparatus to:
monitor if the terminal performs a handover from the first cell or reestablishes a radio link after a handover failure in a handover from the first cell or a radio link failure in the first cell;
check if the terminal is served by the second cell if the terminal performs the handover or reestablishes the radio link;
activate the second machine learning model instance to make the second prediction if the terminal is served by the second cell;
infer the decision involving the terminal based on the second prediction; inhibit to infer the decision involving the terminal based on the first prediction if the terminal is served by the second cell.

9. The apparatus according to claim 1, wherein
the decision involving the terminal is related to at least one of a mobility of the terminal and a positioning of the terminal.

10. The apparatus according to claim 1, wherein at least one of the first machine learning model instance and the second machine learning model instance is received from the first cell or the second cell.

11. A non-transitory computer readable medium comprising instructions stored thereon: which, when executed by an apparatus, cause the apparatus at least to:
store, in a cache of a terminal, a first machine learning model instance and a second machine learning model instance that are received, wherein the first machine learning model instance is associated to a first cell and configured to make, if activated, a first prediction for the terminal, and wherein the second machine learning model instance is associated to a second cell different from the first cell and configured to make, if activated, a second prediction for the terminal;
check if a predefined first requirement is fulfilled;
activate the first machine learning model instance to make the first prediction if the predefined first requirement is fulfilled;
infer a decision involving the terminal based on the first prediction if the predefined first requirement is fulfilled;
inhibit to infer the decision involving the terminal based on the second prediction if the predefined first requirement is fulfilled,
wherein the instructions, when executed by the one or more processors, further cause the apparatus to:
if the terminal was handed over from the second cell to the first cell:
check if the terminal is in a predefined cache area related to the second cell and if a predefined cache time has elapsed since the terminal was handed over from the second cell to the first cell;
remove the second machine learning model instance from the cache if the terminal is outside the predefined cache area and the predefined cache time has elapsed.

12. The non-transitory computer readable medium according to claim 11, wherein the instructions, when executed by the one or more processors, further cause the apparatus to:
monitor if an instruction is received from the first cell, wherein the instruction instructs the apparatus to determine that the predefined first requirement is fulfilled.

13. The non-transitory computer readable medium according to claim 11, wherein the predefined first requirement comprises at least one of the following:
the terminal is served by the first cell; or
a criterion is not fulfilled, wherein the criterion is received from the first cell.

14. The non-transitory computer readable medium according to claim 11, wherein the instructions, when executed by the one or more processors, further cause the apparatus to:
inform the first cell that the terminal is storing the first machine learning model instance if the terminal is storing the first machine learning model instance and that the terminal stores the second machine learning model instance if the terminal is storing the second machine learning model instance.

15. The non-transitory computer readable medium according to claim 14, wherein the instructions, when executed by the one or more processors, further cause the apparatus to at least one of the following:
monitor if an inquiry is received and inform the first cell in reply to the inquiry, wherein the inquiry asks if the terminal is storing at least one of the first machine learning model instance and the second machine learning model instance; or
monitor if the terminal performs a handover to the first cell and inform the first cell when the terminal performs the handover.

16. The non-transitory computer readable medium according to claim 11, wherein the instructions, when executed by the one or more processors, further cause the apparatus to:
activate the second machine learning model instance to make the second prediction if the predefined first requirement is fulfilled.

17. The non-transitory computer readable medium according to claim 16, wherein the instructions, when executed by the one or more processors, further cause the apparatus to:
prohibit the activating the second machine learning model instance if a predefined second requirement is not fulfilled.

18. A method comprising:
storing, in a cache of a terminal, a first machine learning model instance and a second machine learning model instance that are received, wherein the first machine learning model instance is associated to a first cell and configured to make, if activated, a first prediction for the terminal, and wherein the second machine learning model instance is associated to a second cell different from the first cell and configured to make, if activated, a second prediction for the terminal;
checking if a predefined first requirement is fulfilled;

activating the first machine learning model instance to make the first prediction if the predefined first requirement is fulfilled;
inferring a decision involving the terminal based on the first prediction if the predefined first requirement is fulfilled;
inhibiting to infer the decision involving the terminal based on the second prediction if the predefined first requirement is fulfilled; and
if the terminal was handed over from the second cell to the first cell:
checking if the terminal is in a predefined cache area related to the second cell and if a predefined cache time has elapsed since the terminal was handed over from the second cell to the first cell;
removing the second machine learning model instance from the cache if the terminal is outside the predefined cache area and the predefined cache time has elapsed.

* * * * *